United States Patent
Werhahn et al.

[11] Patent Number: 5,861,130
[45] Date of Patent: Jan. 19, 1999

[54] BLOWING GRATE OF A CATALYTIC CRACKING UNIT REGENERATOR, CONTAINING MODULAR CERAMIC PARTS

[75] Inventors: Klaus Werhahn, Isle sur Sorgues; Louis Richaud, Caumont; Jean Rech, Les Angles, all of France

[73] Assignee: Societe Europeenne Des Produits Refractaires, Courbevoie, France

[21] Appl. No.: 765,816

[22] PCT Filed: Jul. 19, 1995

[86] PCT No.: PCT/FR95/00968

§ 371 Date: Jan. 17, 1997

§ 102(e) Date: Jan. 17, 1997

[87] PCT Pub. No.: WO96/03478

PCT Pub. Date: Feb. 8, 1996

[30] Foreign Application Priority Data

Jul. 21, 1994 [FR] France ................................... 94 09020

[51] Int. Cl.⁶ ................. B01J 8/18; F27B 15/08
[52] U.S. Cl. .................. 422/143; 422/144; 110/245; 432/58
[58] Field of Search ..................... 422/143, 144; 110/245; 432/58

[56] References Cited

U.S. PATENT DOCUMENTS

| | | | |
|---|---|---|---|
| 3,283,413 | 11/1966 | Mayer et al. | 422/143 |
| 3,404,845 | 10/1968 | Schemeling et al. | 422/143 |
| 3,508,341 | 4/1970 | Price | 422/143 |
| 3,829,983 | 8/1974 | White | 422/143 |
| 4,532,108 | 7/1985 | Becht, IV | 422/143 |
| 5,230,868 | 7/1993 | Engstrom | 422/143 |
| 5,568,776 | 10/1996 | Suraniti et al. | 110/245 |

FOREIGN PATENT DOCUMENTS

| | | |
|---|---|---|
| 635786 | 12/1963 | Belgium . |
| 34 07 441 | 9/1984 | Germany . |
| 40 04 886 | 10/1990 | Germany . |
| 1069729 | 5/1967 | United Kingdom . |

*Primary Examiner*—Nina Bhat
*Attorney, Agent, or Firm*—Young & Thompson

[57] ABSTRACT

A modular ceramic protective part for a metal blowing grate (1) in a catalytic cracker regenerator, comprises a tubular nozzle portion (4) and a flange portion (6) extending substantially perpendicularly from one end thereof. The part is useful in chemical engineering.

11 Claims, 3 Drawing Sheets

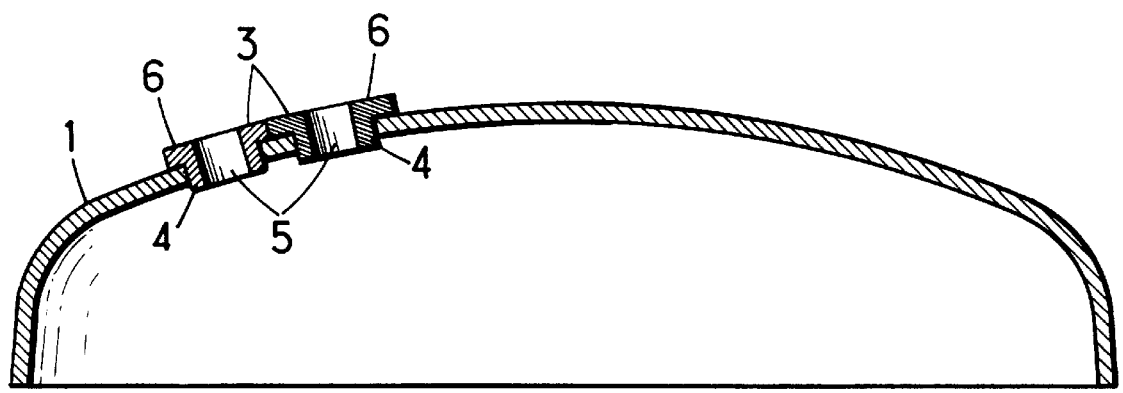
FIG.:1
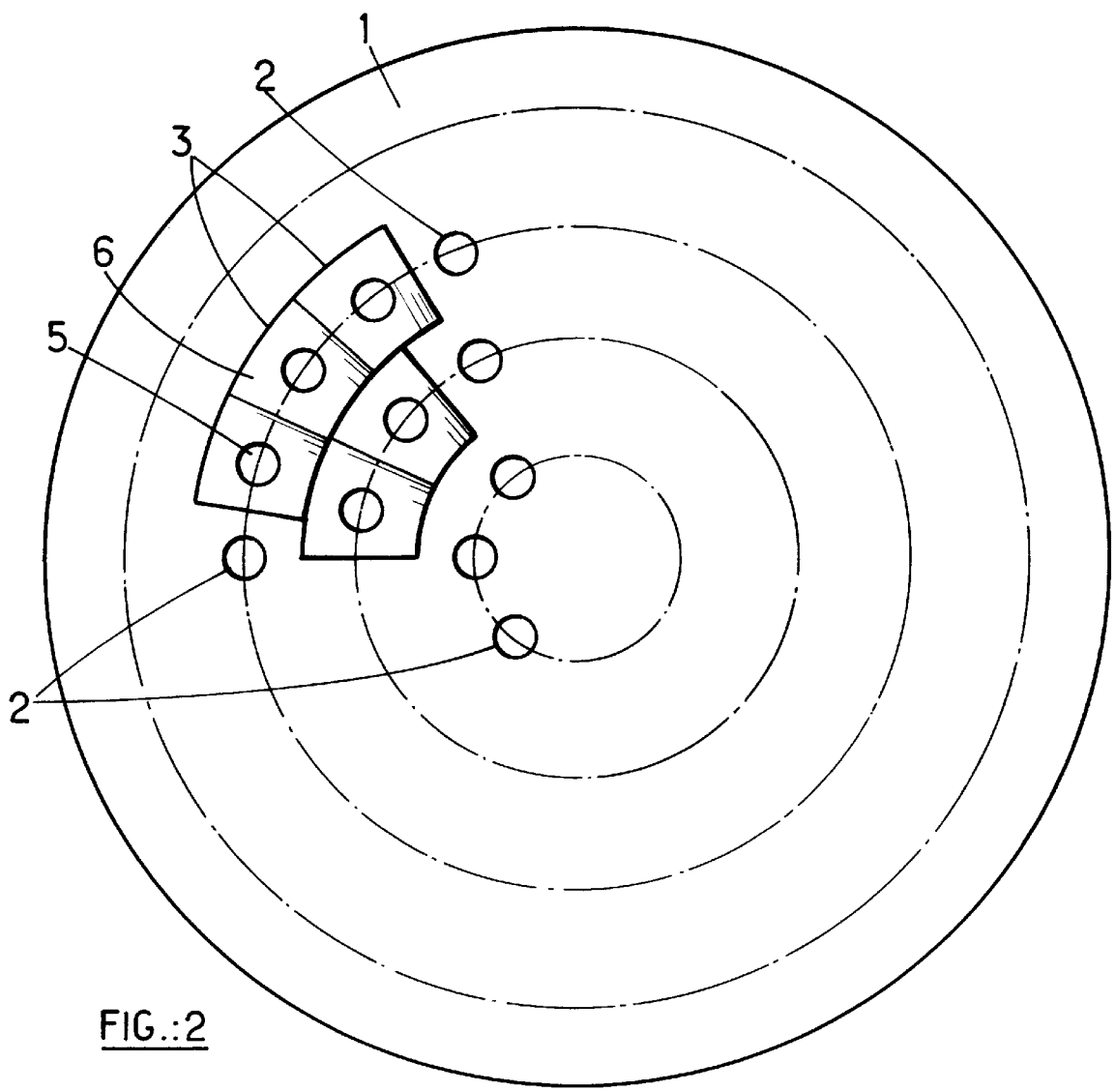
FIG.:2

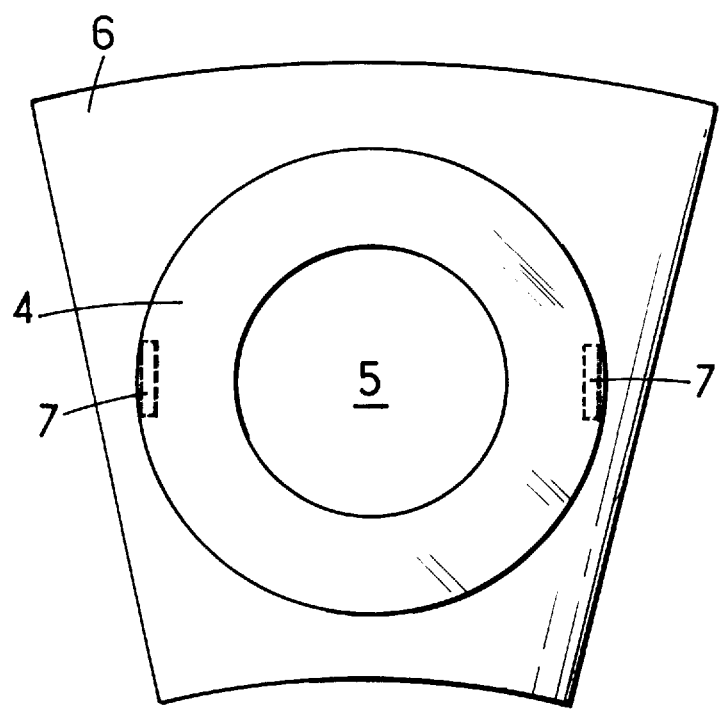
FIG.:3
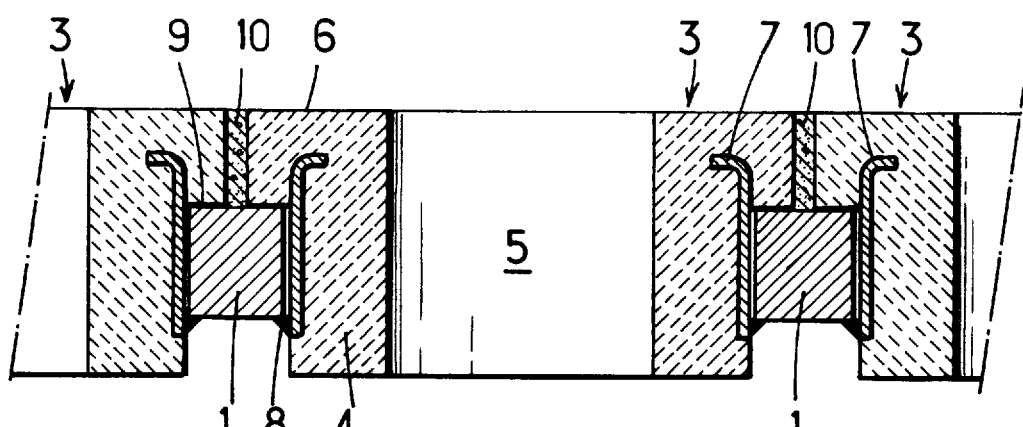
FIG.:4

BLOWING GRATE OF A CATALYTIC CRACKING UNIT REGENERATOR, CONTAINING MODULAR CERAMIC PARTS

This application is the 35 USC 371 national stage of international application PCT/FR95/00968, filed on Jul. 19, 1995, which designated the United States of America.

CROSS REFERENCE TO RELATED APPLICATIONS

FIELD OF THE INVENTION

The invention relates to a modular ceramic protective part and a blowing grate of a catalytic cracking unit regenerator equipped with a protective covering formed by such parts.

BACKGROUND OF THE INVENTION

The catalytic cracking of hydrocarbons is a process which is widely used for producing fuels, in particular for automobiles, which takes place in the vapor phase at a temperature of between 500° and 700° C.

The equipment includes three main elements, namely the reactor, the regenerator and the separator.

The catalyst circulates between the reactor and the regenerator inside transfer tubes. One of them conveys the catalyst to the regenerator, while the other is taken by the regenerated activating agent returning to the reactor.

This catalyst is a solid pulverulent material, in general an aluminosilicate of the zeolite type with a particle size between 20 and 150 $\mu$m having a large surface area.

The critical part of this equipment is the regenerator, the base of which includes a perforated metal piece, referred to as the blowing or injection grate. The latter is either flat or curved, which is the most general case.

It is through this grate that a hydrocarbon/ catalyst/air mixture is introduced into the regenerator. The perforations of this grate are equipped with stainless steel nozzles referred to as injectors. At these injectors, acting as venturis, rapid vaporization of the mixture into the regeneration chamber takes place, which gives it a speed of the order of 100 m/s. The catalyst thus entrained at high speed is particularly abrasive. Wear occurs on the injection region and on the top of the grate.

When the mixture enters the regenerator proper, which has a diameter of 3.5 m to 11 m depending on the processing capacity, an abrupt decrease in the flow speed of the gas flow takes place as a result of the change in the passage cross sections, which causes the reaction mixture to be separated into 2 phases. The catalyst remains essentially in the lower part of the regenerator, where it constitutes a layer which is subjected to very strong turbulent movements that are particularly damaging to the covering, but the surface of which remains in steady state, at a constant level just like a liquid.

Because of this abrasion and the temperature prevailing in the regenerator, the top of the injection grate should be equipped with an abrasion-resistant refractory covering which should also withstand the very strong vibrations caused by the turbulence, or else be degraded rapidly.

FR-A-2 569 828 or U.S. Pat. No. 4,651,447 describe a wear-resistant refractory lining formed by anchoring a layer of refractory material, such as a concrete, using special metal elements welded onto a casing to be protected.

This solution requires very long assembly and repair times, and a high degree of erosion/corrosion also remains at the passages. This solution improves the lifetime of the grate, but not the lifetime of the nozzles housed in the passages. Concrete and nozzles must be replaced at each shutdown.

In order to improve this situation, electrofused ceramic nozzles may be substituted in place of the stainless steel nozzles.

The current solution which has to date been most successful therefore consists in jointly using a lining of the abovementioned type and tubular ceramic parts forming nozzles, obtained by melting, casting and molding a mixture consisting essentially of alumina, zirconia and silica. The nozzles are housed in each of the holes in the grate which form the injection passages, and are held in place by a metal collar which also makes it possible to compensate for the differential expansion between the steel grate and each ceramic nozzle.

An assembly of this type is produced in three steps:

fitting the ceramic nozzles, with their metal collar, in the passages in the grate, then welding the metal collar onto the grate, fitting the metal elements for anchoring the refractory concrete, outside the passage regions, and welding these elements onto the grate, and pouring the refractory concrete.

In the event of partial repair being required, it is difficult to repair only a highly localized region and the repair time is long, which leads to down time for the cracking unit.

The weak point in this current solution therefore remains the concrete which must be replaced fully or partially at each shutdown in order to try to obtain periods of operation of the order of 6 years, while after 9 years of operation only about 10% of the total number of the ceramic nozzles would need to be replaced.

There is therefore a requirement for protection which is more effective and easier to produce than those currently known.

SUMMARY OF THE INVENTION

The object of the invention is to meet this need by providing a novel solution for protecting the blowing grate and the injection passages, which has greater durability, is simpler to use than prior art techniques and allows rapid localized partial repairs.

More particularly, the invention relates to a modular ceramic protective part for a metal blowing grate of a catalytic cracking unit regenerator, characterized in that it includes a tubular portion forming a nozzle, and a paving tile portion extending substantially perpendicular to the tubular portion from one end thereof.

The paving tile portion may have a wide range of shapes, for example polygonal, such as hexagonal, in the shape of a ring sector, etc.

The paving tile portion may be plane or slightly curved in order to match the curvature of the grate to be protected. Purely by way of indication, its thickness will be of the order of 20 to 35 mm, while its average length will be of the order of 120–180 mm.

The tubular part forming a nozzle is intended to be positioned in one of the perforations in the blowing grate, and may have a length equal to or slightly greater than the thickness (which is usually 20 to 40 mm) of the grate. It is usually preferred for this length to exceed the thickness of the grate by about 5 to 100 mm, in particular by about 10 mm, because it has been observed that better protection of the injection passages would thus be obtained. The internal and external diameters of the tubular part will usually be 20–70 mm and 40–130 mm, respectively.

The protective part of the invention preferably further includes a means for fastening to the blowing grate. According to a particularly preferred embodiment, the fastening means consists of at least one metal element (hereafter referred to as an "insert") partially embedded in the ceramic material constituting the part of the invention, it being possible for this metal insert to be welded, for example, to the grate.

The fastening insert or inserts may be arranged, for example, either under the paving tile portion and at the periphery thereof, in order to allow fastening by lateral welding, or in the tubular part and so as to extend below the metal grate, which allows it to be fastened rapidly and easily by welding.

The modular part according to the invention may be manufactured directly by casting/molding; pressing; or melting, casting and molding, according to the conventional manufacturing techniques for shaped parts made of refractory materials.

It is preferably monolithic, that is to say it consists of a single piece and a single type of material.

The modular part will usually be formed, at least for the most part, by refractory oxides such as alumina, zirconia or an alumina/zirconia/silica combination (AZS materials). The term "for the most part" means products in which the oxide content is greater than 50%.

Carbides, nitrides or borides may also be incorporated in the base oxides in order to reinforce them.

Among the AZS materials which are suited to producing these parts, mention may in particular be made of those which essentially consist, in % by weight, of:

$Al_2O_3$=45–51%, $ZrO_2$=32–41%, $SiO_2$=12–16%, $Na_2O$ and/or $K_2O$32 1–1.2% and the sum MgO+CaO+$Fe_2O_3$+$TiO_3 \leq 0.3\%$.

A preferred refractory material for producing parts of the invention comprises, in percentages by weight, 50% of $Al_2O_3$, 32.5% of $ZrO_2$, 16% of $SiO_2$, 1.1% of $Na_2O$ and/or $K_2O$ and $\leq 0.4\%$ of MgO, CaO, $Fe_2O_3$ and $TiO_2$ in total.

The materials described in European Patent No. 0,334,689 could also be used, the composition of which is, in % by weight: $Al_2O_3$=40–75%, $ZrO_2$=20–45%, $SiO_2$=5–20%, $NaO_2$=0–2.7%, $K_2O$=0.15–4.25% and the total of $Fe_2O_3$+$TiO_2$+CaO+MgO=0–0.3%.

In general, it is deemed to be within the scope of the person skilled in the art to determine, from known refractory ceramics, those which will be suitable for manufacturing the parts of the invention.

The invention also relates to a metal blowing grate of a catalytic cracking unit regenerator, characterized in that it is provided with a protective covering consisting of a plurality of modular ceramic protective parts according to the invention, the paving tile portions of which are arranged beside one another with a small mutual clearance, said clearance being pointed with refractory concrete.

Finally, the invention relates to a catalytic cracking unit regenerator, characterized in that it includes a metal blowing grate provided with a protective covering, according to the invention.

BRIEF DESCRIPTION OF THE DRAWINGS

The following description, made with reference to the drawings, will clearly show how to implement the invention.

In the drawings:

FIG. 1 is a schematic sectional view of a blowing grate of a blowing grate of a cracking unit regenerator, provided with modular protective parts according to the invention;

FIG. 2 is a schematic top view of the grate in FIG. 1;

FIG. 3 is a bottom view of one of the modular protective parts with which the grate in FIGS. 1 and 2 is equipped;

FIG. 4 is a cross-sectional view illustrating the mounting and fastening of the protective parts on the grate in FIGS. 1 and 2, and FIGS. 5 and 6 are views, respectively in plan and in cross-section, illustrating the use of another type of modular protective part according to the invention.

DETAILED DESCRIPTION OF THE INVENTION

Figure 5:
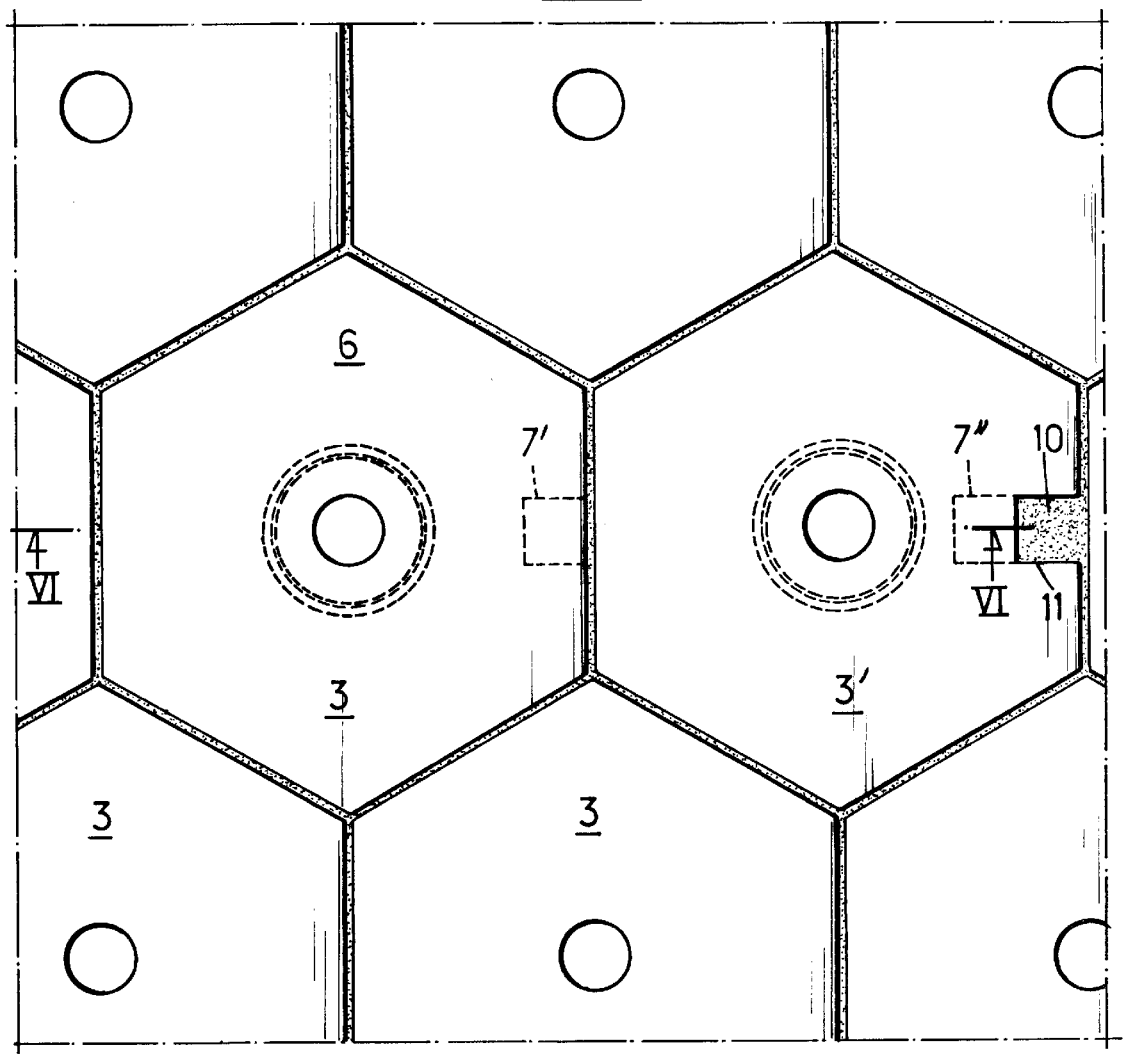

FIGS. 1 to 4 represent a curved, stainless steel blowing grate 1 of a cracking unit regenerator. This grate includes a plurality of perforations or holes 2 and is protected by a plurality of modular parts 3 made of refractory ceramic, only some of which have been represented for the sake of clarity. These modular parts 3 each include a cylindrical portion 4, provided with a bore 5, forming a nozzle, and a part 6 forming a paving tile perpendicular to the portion 4 at the upper end thereof. In elevation, the paving tile portion 6 has the shape of a ring section, as is clearly seen in FIG. 2. The cylindrical portion 4 of each part 3 is fitted into one of the holes 2 in the grate, and the part 3 is fastened to the grate using a suitable fastening means, as described below.

The shape and the dimensions of the paving tile portions 6 are such that they form a kind of paving in which they are slightly spaced apart from one another.

At the periphery of the portion 4, each part 3 is equipped with two diametrically opposite metal tongues 7, for example made of Incoloil 800 HT, one of the ends of which is embedded in the ceramic material containing the part 3. These tongues are used to fasten the part 3 to the grate 1, for example by spot welds 8, as illustrated in FIG. 4. As a variant, it would be possible to use only a single tongue instead of two.

At the time of fitting, a washer 9 formed by a compressible ceramic fiber felt, such as the product K50 marketed by the company Kerlane, is interposed between the part 3 and the grate 1. The role of this washer, which is compressed on assembly (from about 2 mm initially to 1 mm) is to damp the vibrations to which the parts are subjected when in service, and to compensate for the surface irregularities of the grate.

The clearance existing between the paving tile portions is pointed using a refractory concrete 10, such as a concrete of the type with a high alumina or AZS content.

As is seen in FIGS. 1 and 4, the length of the portions 4 of the parts is greater than the thickness of the grate 1, so that the portions 4 protrude below the grate and exert an improved protective effect thereon.

By virtue of the protective covering or lining of the invention, there is only a very small area of exposed concrete in contact with the reaction products and the catalyst. In addition, this exposed surface is protected by the neighboring ceramic paving tile portions. This greatly limits the degradation rate of the grate/protective covering assembly. In the event of it being necessary to repair a part, the damaged part can easily be removed and replaced. It is sufficient to unweld this part, to break the concrete joint connecting it to the adjacent parts, to withdraw the defective part, to fit the new part, to weld it to the grate, and to replace the concrete joint.

Figure 6:
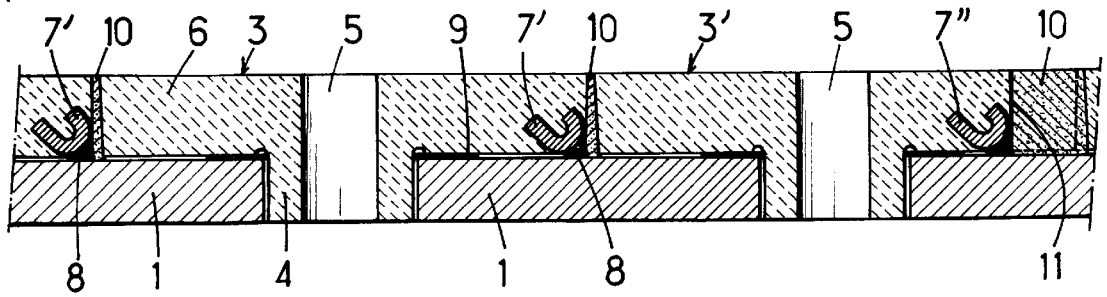

FIGS. 5 and 6 illustrate an alternative embodiment.

In this embodiment, the paving tile portion 6 has a hexagonal shape and the fastening means consists of a bent metal tongue 7' which is mostly embedded in the periphery of the paving tile portion 6. Only the bent part of this tongue is flush with the lower piece of the paving tile portion, so that it can be welded to the grate as the protective parts are mounted on the grate. In addition, in this variant the length of the tubular portion 4 is such that it is flush with the lower surface of the grate.

Of course, if desired, the hexagonal paving tile portion variant which has just been described could be modified in order to adapt the fastening means of the embodiment in FIGS. 1 to 4 to it and/or to proceed so that the tubular portion 4 protrudes from the lower surface of the grate.

The alternative embodiment in FIGS. 5 and 6 also allows easy repairs. It is sufficient to break the paving tile portion of the worn part, to unweld the tongue, and to fit a new part. However, in view of the location of the bent tongue 7' in the parts 3, it would not be possible to weld these parts to the grate, for lack of an access passage. It is therefore suitable to use, as replacement parts, modified parts 3' including a recess 11 which is provided in the paving tile portion and allows access to the tongue 7", which is then offset toward the center of the paving tile portion, flush with the recess 11, as illustrated in FIGS. 5 and 6. After the tongue 7" has been welded, the recess 11 is filled with refractory concrete 10 and it is jointed to the surrounding paving tile portions.

It is clear that the embodiments described are no more than examples and that they could be modified, in particular by substituting technical equivalents, without thereby departing from the scope of the invention.

We claim:

1. Modular ceramic protective part for a metal blowing grate of a catalytic cracking unit regenerator, which includes a tubular portion forming a nozzle, and a paving tile portion extending substantially perpendicular to the tubular portion from one end thereof.

2. Part according to claim 1, wherein the paving tile portion has the shape of a hexagon or of a ring sector.

3. Part according to claim 1, wherein the length of the tubular portion is such that this tubular portion protrudes from the lower surface of the grate.

4. Part according to claim 2, wherein the length of the tubular portion is such that this tubular portion protrudes from the lower surface of the grate.

5. Part according to claim 1, which further includes a means for fastening to the blowing grate.

6. Part according to claim 5, wherein the fastening means consists essentially of at least one metal element partially embedded in the ceramic material constituting the part.

7. Part according to claim 6, wherein the fastening insert is provided under the paving tile portion and at the periphery thereof.

8. Part according to claim 6, wherein the fastening insert is provided in the tubular part and protrudes below the metal grate.

9. Part according to claim 1, which is monolithic.

10. Metal blowing grate of a catalytic cracking unit regenerator, having a protective covering consisting essentially of a plurality of modular ceramic protective parts as defined in claim 1, the paving tile portions of which are arranged beside one another with a small mutual clearance, said clearance being pointed with refractory concrete.

11. Catalytic cracking unit regenerator, which includes a metal blowing grate provided with a protective covering, as defined in claim 10.

* * * * *